(12) United States Patent
Laumen et al.

(10) Patent No.: US 7,623,506 B2
(45) Date of Patent: Nov. 24, 2009

(54) METHOD FOR TRANSMITTING DATA VIA COMMUNICATION NETWORKS

(75) Inventors: Josef Laumen, Hildesheim (DE);
Andreas Schmidt, Braunschweig (DE);
Markus Trauberg, Velchede (DE)

(73) Assignee: Siemens Aktiengesellschaft, Munich (DE)

( * ) Notice: Subject to any disclaimer, the term of this patent is extended or adjusted under 35 U.S.C. 154(b) by 892 days.

(21) Appl. No.: 10/468,314

(22) PCT Filed: Jan. 24, 2002

(86) PCT No.: PCT/DE02/00240

§ 371 (c)(1),
(2), (4) Date: Aug. 15, 2003

(87) PCT Pub. No.: WO02/065718

PCT Pub. Date: Aug. 22, 2002

(65) Prior Publication Data

US 2004/0066778 A1    Apr. 8, 2004

(30) Foreign Application Priority Data

Feb. 15, 2001    (DE)    ................ 101 07 174

(51) Int. Cl.
*H04L 12/66*    (2006.01)

(52) U.S. Cl. .............. 370/352; 370/474; 709/200; 709/201; 709/203; 709/206; 709/207; 709/249; 455/466

(58) Field of Classification Search ............... 370/352, 370/474; 709/200, 201, 203, 206, 207, 249; 455/466

See application file for complete search history.

(56) References Cited

U.S. PATENT DOCUMENTS

| 5,864,684 | A | * | 1/1999 | Nielsen | 709/206 |
| 5,892,909 | A | | 4/1999 | Grasso et al. | |
| 6,052,709 | A | * | 4/2000 | Paul | 709/202 |
| 6,480,480 | B1 | | 11/2002 | Du | 370/338 |
| 6,480,885 | B1 | * | 11/2002 | Olivier | 709/207 |
| 6,714,987 | B1 | | 3/2004 | Amin et al. | 709/249 |
| 6,717,925 | B1 | | 4/2004 | Leppisaari et al. | 370/312 |
| 6,721,785 | B1 | * | 4/2004 | Raghunandan | 709/206 |
| 6,791,963 | B1 | | 9/2004 | Hwang et al. | 370/342 |

(Continued)

FOREIGN PATENT DOCUMENTS

EP    0 306 781    3/1989

(Continued)

OTHER PUBLICATIONS

David H. Crocker, Standard For The Format Of ARPA Internet Text Messages, Aug. 13, 1982, RFC# 822, pp. 1-49).*

(Continued)

*Primary Examiner*—William Trost, IV
*Assistant Examiner*—Toan D Nguyen
(74) *Attorney, Agent, or Firm*—King & Spalding L.L.P.

(57) ABSTRACT

A method for transmitting data, especially text messages, via communication networks such as Internet or mobile radio telephone services to a selection of addresses contained in a distribution list, Automatic compensation occurs in a network element managing the distribution list between the distribution list and an exclusion list added to the data that is to be transmitted, prior to forwarding said data.

8 Claims, 1 Drawing Sheet

Friends=B@provider1.de; C@provider2.de; D@provider2.de; E@provider2.de;

F@provider3.de; G@I)provider3.de; H@provider3.de; I@provider4.de; J@provider4.de

U.S. PATENT DOCUMENTS

| | | | |
|---|---|---|---|
| 6,848,008 B1 * | 1/2005 | Sevanto et al. | 709/249 |
| 6,965,580 B1 | 11/2005 | Takagi et al. | 370/312 |
| 2001/0055298 A1 | 12/2001 | Baker et al. | 370/349 |
| 2002/0080854 A1 | 6/2002 | Rebhan et al. | 375/132 |
| 2002/0107925 A1 * | 8/2002 | Goldschneider et al. | 709/206 |

FOREIGN PATENT DOCUMENTS

| | | |
|---|---|---|
| EP | 1071296 | 7/1999 |
| EP | 0993148 | 9/1999 |
| JP | 2000049849 | 2/2002 |
| WO | 99/08457 | 2/1999 |

OTHER PUBLICATIONS

XP-002191629—3rd Generation Partnership Project: Technical Specification Group Radio Access Network; Radio Interface for broadcast/multicast services; pp. 30, 1999.

XP-002192128—Chapter 6 WCDMA; pp. 34, 1999.

Office Action from U.S. Patent Application Publication No. 2003/0035423; pp. 8, Date Mailed: Nov. 12, 2008.

Office Action from U.S. Patent Application Publication No. 2003/0035423; pp. 11, Date Mailed: Feb. 5, 2008.

Office Action from U.S. Patent Application Publication No. 2003/0035423; pp. 10, Date Mailed: Jun. 14, 2007.

Office Action from U.S. Patent Application Publication No. 2003/0035423; pp. 10, Date Mailed: Oct. 3, 2006.

* cited by examiner

FIG 1

Friends=B@provider1.de; C@provider2.de; D@provider2.de; E@provider2.de;
F@provider3.de; G@I)provider3.de; H@provider3.de; I@provider4.de; J@provider4.de

FIG 2

To: B@provider1.de; C@provider2.de; E@provider2.de; F@provider3.de; G@provider3.de;
I@provider4.de; J@provider4.de;

From: A@provider1.de

FIG 3

To: Friends

Exc: D@provider2.de; H@provider3.de

...

From: A@provider1.de

...

METHOD FOR TRANSMITTING DATA VIA COMMUNICATION NETWORKS

BACKGROUND

The present invention relates to a method for transmitting data over communication networks.

The selective transmission of data or the sending of e-mails to specific recipients over the Internet has become increasingly more significant in recent years. The same applies analogously to the sending of text messages, so-called Short Messages (SMS), over existing GSM mobile radio networks.

For the next generation mobile radio systems, so-called UMTS (Universal Mobile Telecommunication System) networks, similar messaging systems are also provided with, in particular, a multimedia-enabled variant of a mobile messaging service, the so-called MMS (Multimedia Messaging Service). The aim is to extend the advantages of e-mailing, which is already well known on the Internet, to mobile applications.

Predominantly two network elements are active when an electronic mail (e-mail) is sent within an IP (Internet Protocol) network (IP: Internet Protocol) or between IP networks. The electronic mail is first composed in the (UA: User Agent) (i.e., the text is written, files may be attached, and addressing is carried out. The electronic mail is then sent from the UA to a known MTA (MTA: Message Transfer Agent). It is transported by various other MTA's through the network to the recipient's e-mail system.

A sender wishing to send the same electronic mail to several recipients can set up a distribution list containing all the recipients' addresses and, upon sending the electronic mail, use the relevant distribution list as the recipient's address for addressing. When the electronic mail has been delivered to the network element administering the distribution list, a separate electronic mail is produced there for each individual member of this distribution list and this mail is then individually forwarded.

Distribution lists can be set up on different network elements, that is to say locally in the UA, at the sender's MTA, or somewhere on a network server, as what is called a reflector. Several copies of an electronic mail addressed to a distribution list can be generated either already in the sender's UA, at the sender's MTA, or not until the server administering the reflector has been reached, and forwarded as individual mails.

An electronic mail consists of a header and a body. The header contains data that is needed by the MTAs for transporting the electronic mail, while the body contains the actual message. The same principle applies to the structure of a multimedia message. Provision has also been made in the MMS for using some RFC #822 (Request for Comments #822) standard header fields alongside other MMS-specific headers.

A disadvantage of the previously known methods for transmitting data or electronic mail to a selection of addressees in a distribution list is that all the addresses comprising the selection have to be entered separately. Thus, the distribution list is no longer useable as of the moment a small number of addressees in the distribution list are to be excluded from receiving a mail.

SUMMARY

According to the present disclosure, a method for transmitting data over a communication network to a selection of addresses contained in the distribution list is disclosed. The method includes adding an exclusion list to the data that is to be transmitted when at least one address of the distribution list is to be excluded and synchronizing in a network element managing the distribution list between the distribution list and the exclusion list prior to transmitting the data.

BRIEF DESCRIPTION OF THE DRAWINGS

FIG. 1 illustrates a schematic example of a distribution list.

FIG. 2 illustrates a representation of addressing according to the prior art for transmission to a selection of addresses in a distribution list.

FIG. 3 illustrates a representation of addressing for transmission to a selection of addresses in a distribution list according to disclosed method.

DETAILED DESCRIPTION OF THE PRESENT EXAMPLES

FIG. 1 shows in schematic form a distribution list of the type that could be used for the group sending of electronic messages such as e-mail, SMS, MMS, etc. The addresses of nine persons (B to J) have been combined in the distribution list, as shown.

Someone wishing to send an inquiry to the addresses contained in the distribution list, but excluding address D and address H, currently has the sole option of indicating one by one all the addresses in the distribution list that are to receive the inquiry.

This situation is shown in FIG. 2. According to the conventional art, the header of an e-mail for this case has the following appearance: 7 (=9−2) recipients' addresses, which is to say the nine addresses in the distribution list according to FIG. 1, minus addresses D and H, are entered one by one in the RFC #822 standard header field designated "To".

According to the present disclosure, a method is now provided for transmitting data, especially electronic text messages, over communication networks such as Internet, mobile radio telephone services, etc., to a selection of addressees contained in a distribution list. In this method, automatic synchronizing takes place in a network element managing the distribution list between the distribution list and an exclusion list added to the data that is to be transmitted. Prior to forwarding the data, the sender will be able, in the customary manner, to address his/her electronic inquiry, e-mail, or transmission to the distribution list according to FIG. 1 and additionally indicate the addressee(s) who is/are to be excluded from receiving the electronic inquiry. This situation is shown schematically in FIG. 3.

In this case the header field designated "To" contains, in the customary manner, only the name of the distribution list, in this case "Friends". The addresses of recipients who are to be excluded are located in the newly introduced header field, which could, for example, be designated 'Exc' (standing for 'Exclude'), but which could also be designated by any other suitable term.

When the electronic mail has been received, the network element, UA, MTA, or server responsible for evaluating the distribution list first checks whether the 'Exc' field is present and whether the recipients' addresses therein are also actually contained in the distribution list. If this is the case, these will be excluded from further dispatch of the individual mailings to the individual recipients' addresses.

The additional header field "Exc" was introduced in the above example as an RFC #822 standard header field. The additional field could, alternatively or additionally, also be implemented for MMS traffic in mobile radio telephone services. A possible designation for the additional header field in the area of MMS could be X-MMS-Exclude, for example.

Header fields in the MMS can be efficiently encoded according to the MMS encapsulation standard: A hexadecimal encoding Ox1 F (decimal 31), for example, is a conceivable possibility for encoding the new additional header field. A further conceivable possibility is to encode the entries of the new header field as a text string.

The present disclosure therefore teaches a method for transmitting data, especially electronic text messages, over communication networks that allows restriction to a selection of addressees contained in a distribution list, with simultaneous use of the distribution list.

The above disclosed exclusion list may be implemented by use of an additional header field. The additional header field can be provided as an RFC #822 standard header field. However, in the Multimedia Messaging Service (MMS) the additional header field can just as well be encoded according to the MMS encapsulation standards, with the possibility of using hexadecimal encoding such as Ox1F (decimal 31). The additional header field can, however, also be encoded as a text string.

The disclosed method may also be embodied such that the network element administering the distribution list checks prior to synchronizing of the distribution list whether an exclusion list exists at all.

Accordingly, the method according to the present disclosure results in significant simplifications.

Assuming that an electronic mail is to be sent to ninety-nine out of one hundred addresses in a distribution list, using the known methods of the prior art, the sender would have to enter the ninety-nine recipients' addresses one by one. However, according to the disclosed method, the sender can, in the customary way, continue specifying the distribution list as the recipients' address and in a separate field additionally specify the address(es) of the recipient(s) who is/are to be excluded from receiving the electronic mail. This considerably improves, among other things, the level of convenience in addressing electronic mails. The presently disclosed method also particularly affords connection with the sending of electronic mail via mobile radio systems because the volume of data involved in transmission via the very expensive air interface between the mobile radio device and base station can be significantly reduced, which is of major advantage in both technical and economic terms.

Although preferred examples have been disclosed for illustrative purposes, those of ordinary skill in the art will appreciate that the scope of this patent is not limited thereto. On the contrary, this patent covers all apparatus and methods found within the scope of the appended claims.

The invention claimed is:

1. A method for transmitting data over a communication network to a selection of addresses contained in a distribution list, the method comprising:
   adding an exclusion list to the data that is to be transmitted when at least one address of the distribution list is to be excluded; and
   automatically synchronizing in a network element managing the distribution list between the distribution list and the exclusion list prior to transmitting the data,
   wherein the exclusion list is implemented by an additional header field in the data.

2. The method as defined in claim 1, wherein the network element managing the distribution list is configured to check whether the exclusion list exists prior to synchronizing.

3. The method as defined in claim 1, wherein the additional header field is a RFC #822 standard header field.

4. The method as defined in claim 1, wherein the additional header field is encoded in a Multimedia Messaging Service (MMS) according to MMS encapsulation standards.

5. The method as defined in claim 4, wherein hexadecimal encoding is used for encoding the additional header field.

6. The method as defined in claim 5, wherein Ox1F (decimal 31) hexadecimal encoding is used for encoding.

7. The method as defined in claim 1, wherein entries in the additional header field are encoded as a text string.

8. The method as defined in claim 1, wherein the communication network comprises at least one of the Internet and mobile radio telephone services.

* * * * *